United States Patent
Tautz et al.

(10) Patent No.: US 9,581,828 B2
(45) Date of Patent: Feb. 28, 2017

(54) OPTICAL SYSTEM FOR IMAGING AN OBJECT

(71) Applicant: Carl Zeiss Sports Optics GmbH, Wetzlar (DE)

(72) Inventors: Volker Tautz, Wetzlar (DE); Erhard Mutz, Waldsolms (DE); Christian Bach, Buseck (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 57 days.

(21) Appl. No.: 14/372,138

(22) PCT Filed: Jan. 9, 2013

(86) PCT No.: PCT/EP2013/050282
§ 371 (c)(1),
(2) Date: Jul. 14, 2014

(87) PCT Pub. No.: WO2013/104657
PCT Pub. Date: Jul. 18, 2013

(65) Prior Publication Data
US 2016/0011433 A1    Jan. 14, 2016

Related U.S. Application Data

(60) Provisional application No. 61/586,272, filed on Jan. 13, 2012.

(30) Foreign Application Priority Data

Jan. 13, 2012 (DE) ........................ 10 2012 200 519

(51) Int. Cl.
*G02B 27/64*    (2006.01)
*G02B 25/00*    (2006.01)
*G02B 23/02*    (2006.01)

(52) U.S. Cl.
CPC ........... *G02B 27/646* (2013.01); *G02B 23/02* (2013.01); *G02B 25/001* (2013.01); *G02B 25/004* (2013.01)

(58) Field of Classification Search
CPC .... G02B 27/64; G02B 27/642; G02B 27/646; G02B 23/02; G02B 25/001
(Continued)

(56) References Cited

U.S. PATENT DOCUMENTS

| | | |
|---|---|---|
| 3,378,326 A | 4/1968 | Alvarez |
| 3,504,957 A | 4/1970 | Heflinger et al. |

(Continued)

FOREIGN PATENT DOCUMENTS

| | | |
|---|---|---|
| DE | 1 944 190 | 4/1970 |
| DE | 2 261 326 | 4/1974 |

(Continued)

OTHER PUBLICATIONS

Von R. Liebmann, "Geradsichtige Feldstecher-Prismenumkehrsysteme ohne oder mit nur geringem Achsversatz," Optik 26, 1967/1968, Heft 3, pp. 264-272 (with translation).

*Primary Examiner* — Frank Font
(74) *Attorney, Agent, or Firm* — Muirhead and Saturnelli, LLC (57) ABSTRACT

An optical system for imaging an object has at least a first objective, at least a first image stabilizing unit and at least a first eyepiece, wherein, as seen in the direction of the first eyepiece from the first objective, the first objective is arranged first along a first optical axis, then followed by the first image stabilizing unit and then followed by the first eyepiece. The first image stabilizing unit is rotatably mounted in cardan-joint fashion about a first hinge point, and the first hinge point is arranged between the first objective and the first eyepiece. The optical system is (Continued)

distinguished by virtue of the fact that the first image stabilizing unit comprises a first lens unit and at least a further optical element, wherein the first lens unit and the optical element are arranged such that the first lens unit is, together with the optical element, rotatably mounted in cardan-joint fashion about the first hinge point.

21 Claims, 4 Drawing Sheets (58) Field of Classification Search
USPC .................. 359/407, 431, 554–557, 813
See application file for complete search history.

(56) References Cited

U.S. PATENT DOCUMENTS

| | | | |
|---|---|---|---|
| 3,531,176 A | 9/1970 | Humphrey | |
| 3,532,409 A | 10/1970 | Humphrey | |
| 3,582,180 A | 6/1971 | Gross | |
| 3,608,995 A | 9/1971 | Humphrey | |
| 3,650,596 A * | 3/1972 | Thevenaz | G02B 27/64 356/149 |
| 4,062,267 A * | 12/1977 | Vinches | F41G 3/08 89/206 |
| 4,131,333 A | 12/1978 | Humphrey | |
| 4,208,087 A | 6/1980 | Cooper et al. | |
| 4,235,506 A | 11/1980 | Saito et al. | |
| 4,356,758 A * | 11/1982 | Teiling | G02B 27/64 235/404 |
| 4,417,788 A * | 11/1983 | Alvarez | G02B 27/644 250/201.1 |
| 4,465,346 A | 8/1984 | Fraser | |
| 4,542,962 A * | 9/1985 | Stromberg | G02B 27/646 359/556 |
| 5,029,995 A * | 7/1991 | Weyrauch | G02B 27/646 359/407 |
| 5,089,911 A * | 2/1992 | Weyrauch | G02B 27/646 359/407 |
| 5,672,862 A * | 9/1997 | Ohara | G02B 27/646 250/204 |
| 5,798,863 A | 8/1998 | Udagawa et al. | |
| 6,046,853 A | 4/2000 | Yano | |
| 6,064,532 A | 5/2000 | Enomoto | |
| 6,067,194 A * | 5/2000 | Stroemberg | G02B 27/646 359/407 |
| 6,072,630 A | 6/2000 | Yano | |
| 6,198,575 B1 | 3/2001 | Yano | |
| 6,226,123 B1 | 5/2001 | Kanai et al. | |
| 6,226,124 B1 | 5/2001 | Enomoto et al. | |
| 6,246,520 B1 | 6/2001 | Iizuka | |
| 6,377,399 B1 * | 4/2002 | Yanari | G02B 27/646 359/407 |
| 6,392,804 B1 | 5/2002 | Yano et al. | |
| 6,807,007 B2 | 10/2004 | Yano | |
| 6,917,470 B2 | 7/2005 | Iizuka | |
| 6,919,998 B2 | 7/2005 | Momoki | |
| 2003/0137582 A1 * | 7/2003 | Filous | G03B 19/20 348/37 |
| 2007/0019293 A1 | 1/2007 | Baumann et al. | |
| 2007/0019294 A1 | 1/2007 | Baumann et al. | |
| 2012/0229814 A1 * | 9/2012 | Freimann | G01B 11/2441 356/512 |
| 2016/0011433 A1 * | 1/2016 | Tautz | G02B 25/004 359/431 |

FOREIGN PATENT DOCUMENTS

| | | | |
|---|---|---|---|
| DE | 23 53 101 | | 5/1974 |
| DE | 2 419 532 | | 11/1974 |
| DE | 28 34 158 C3 | | 2/1980 |
| DE | 38 43 776 A1 | | 7/1990 |
| DE | 39 33 255 C2 | | 5/1991 |
| DE | 199 00 162 C2 | | 7/1999 |
| DE | 199 43 371 C2 | | 3/2000 |
| DE | 694 26 246 T2 | | 3/2001 |
| DE | 199 00 163 C2 | | 1/2002 |
| DE | 199 18 571 C2 | | 6/2002 |
| DE | 10 2004 037 481 A1 | | 3/2006 |
| DE | 10 2005 027 871 A1 | | 12/2006 |
| EP | 0 016 137 B1 | | 10/1980 |
| EP | 0 082 178 B1 | | 6/1983 |
| EP | 0 376 108 A2 | | 7/1990 |
| EP | 0 636 916 B1 | | 11/2000 |
| EP | 1 731 944 A1 | | 12/2006 |
| GB | 1915 06977 | | 7/1921 |
| GB | 232759 | | 4/1925 |
| GB | 707459 A * | 4/1954 | G01C 11/00 |
| GB | 1 549 824 | | 8/1979 |
| GB | 2 019 596 A | | 10/1979 |
| JP | 2008 040065 A | | 2/2008 |
| JP | 2008 180964 A | | 8/2008 |
| RU | 2080634 C1 | | 5/1997 |

* cited by examiner

OPTICAL SYSTEM FOR IMAGING AN OBJECT

RELATED APPLICATIONS

This application claims priority to U.S. Provisional App. 61/586,272, filed Jan. 13, 2012, which is incorporated herein by reference.

TECHNICAL FIELD

This application relates to an optical system for imaging an object, wherein the optical system has an objective, an image stabilizing unit and an eyepiece. The optical system is more particularly designed as binocular field glasses, as monocular field glasses, as a spotting scope or as a telescope.

BACKGROUND OF THE INVENTION

By way of example, the optical system referred to above is used in a telescope or in field glasses. The image captured by an observer through the telescope or field glasses is often perceived to be shaking because trembling movements or rotational movements of the hands of the user, and also movements underfoot, in turn cause movements of the optical system. In order to avoid this, it is known to stabilize images in an optical system. Known solutions use stabilizing apparatuses for stabilizing the image by means of a mechanical apparatus and/or an electronic apparatus. Furthermore, so-called passive stabilizations and active stabilizations are known, as will still be explained in more detail below.

A passive stabilization is known from DE 23 53 101 C3. This document describes an optical system in the form of a telescope, which has an objective, an image stabilizing unit in the form of a prism erecting system and an eyepiece. As seen in the direction of the eyepiece from the objective, the objective is arranged first along an optical axis of the optical system, then followed by the image stabilizing unit and then followed by the eyepiece. The prism erecting system is mounted in cardan-joint fashion in a housing of the telescope. This is understood to mean that the prism erecting system is arranged in the housing of the telescope such that the prism erecting system is rotatably mounted about two axes arranged at right angles to one another. For the rotatable mounting, use is made of a device which is referred to as a cardan suspension. The two aforementioned axes intersect at a hinge point. In the case of the known optical system, provision is now made for arranging the hinge point centrally between an image-side main plane of the objective and an object-side main plane of the eyepiece. The prism erecting system, mounted in a cardan-joint fashion, is not moved by occurring rotational-trembling movements as a result of its inertia (passive stabilization). It therefore remains fixed in space. This is how image shaking which occurs as a result of the rotational-trembling movement of the housing is compensated for.

By way of example, an active stabilization has been disclosed in DE 39 33 255 C2. This document has disclosed binocular field glasses with an image stabilization having a prism erecting system. The prism erecting system has Porro prisms, which respectively have one tilt axis. The Porro prisms are designed such that they can pivot about their respective tilt axis. Motors are provided for pivoting the Porro prisms (active stabilization). The pivoting is brought about dependent on a trembling movement, which causes a shaking of an observed image such that image deterioration is avoided.

A further example of a known passive stabilization is disclosed in DE 28 34 158 C3. This document discloses a telescope with an arrangement consisting of an objective, a prism erecting system and an eyepiece, wherein provision is made for two partial telescopes, which each have one instance of the aforementioned arrangement. The prisms of the prism erecting systems of the two partial telescopes are mounted in a common cardan suspension in a housing. The hinge point lies in the center between the image-side main plane of the objective and the object-side main plane of the eyepiece. Moreover, the hinge point lies in the center of gravity of the cardan suspension. However, it has now been found that in the case of telescopes with a magnification of greater than 8, each of the prism erecting systems is arranged closer to the corresponding eyepiece than to the respective objective. So that each prism erecting system in the cardan suspension is in equilibrium it is necessary to provide at least one counterweight. However, the use of a counterweight is not necessarily desirable because this increases the weight of the telescope.

In order to avoid the use of a counterweight, use can for example be made of an active stabilization, as already described further above. Then it is no longer necessary to place the hinge point of the prism erecting system in the center between the image-side main plane of the objective and the object-side main plane of the eyepiece. Rather, the position of the hinge point can be freely selected on the optical axis of the optical system. However, if the hinge point is closer to the eyepiece than to the objective, it was found that the prism erecting system should be tilted against the tilt of the housing by an angle (prism tilt angle) which is greater than the magnitude of the angle of the tilt of the housing. The prism tilt angle of the tilt relative to the objective and relative to the eyepiece in addition to the trembling movement causes an aberration in the form of coma for the imaging of an object, and so the image quality is reduced. Accordingly, the prism erecting system produces this coma. However, deterioration in the image quality is undesirable.

U.S. Pat. No. 6,067,194 has disclosed a further optical system with a passive stabilization. This known optical system has an objective, an erecting system and an eyepiece. The erecting system has a plurality of elements. Thus, it has a deflection mirror, a Schmidt prism and a prism for 180° deflection. The eyepiece and the prism for 180° deflection are fixedly connected to a housing and are co-moved as a result of a trembling movement of a user. The Schmidt prism and a lens with negative refractive power are arranged as a single assemblage such that they can pivot about a horizontal axis. In the assemblage itself a vertical axis is realized in turn, about which a further assemblage consisting of the objective and the deflection mirror can be pivoted. For the purposes of image stabilization, provision is made for pivoting the Schmidt prism and the lens with negative refractive power about the horizontal axis by virtue of the inertia thereof. Moreover, the objective and the deflection mirror can additionally pivot about the vertical axis. The two axes (i.e. the horizontal axis and the vertical axis) do not intersect at a common intersection. Accordingly, this is not a hinge point of a cardan suspension as described above.

Accordingly, it would be desirable to specify an optical system with image stabilization, which firstly dispenses with the use of counterweights and secondly compensates for or prevents the aberrations, in particular coma, introduced by an erecting system.

SUMMARY

According to the system described herein, the optical system for imaging an object has at least a first objective, at least a first image stabilizing unit and at least a first eyepiece. Furthermore, as seen in the direction of the first eyepiece from the first objective, provision is made for the first objective to be arranged first along a first optical axis, then followed by the first image stabilizing unit and then followed by the first eyepiece. The first image stabilizing unit is rotatably mounted in cardan-joint fashion about a first hinge point. As already mentioned above, a cardan-joint-type mounting of the first image stabilizing unit is understood to mean that the first image stabilizing unit is arranged such that the first image stabilizing unit is rotatably mounted about two axes arranged at right angles to one another, namely about a first axis and about a second axis. The intersection of the first axis and the second axis (and optionally the first optical axis) is the first hinge point. Provision is furthermore made for the first hinge point to be arranged between the first objective and the first eyepiece. Moreover, provision is made for the first image stabilizing unit to comprise a first lens unit and at least a first optical element, wherein the first lens unit and the first optical element are arranged such that the first lens unit is, together with the first optical element, rotatably mounted in cardan-joint fashion about the first hinge point. Here, in the text both above and below, a lens unit is understood to mean a unit which has only a single lens or at least two lenses (for example in the form of a lens group).

First of all, it came as a surprise to determine that an image stabilizing unit in the above-described form can be arranged for an optical system according to the system described herein, which has a magnification of greater than 8, such that there no longer is a need for a counterweight for rebalancing the image stabilizing unit. Secondly, it came as a surprise to discover that no bothersome coma occurs as a result of a tilt of the image stabilizing unit or that the occurring coma is so small that it is not perceived as bothersome by a user. Hence the disadvantages of the prior art are avoided.

In one embodiment of the optical system according to the invention, provision is additionally or alternatively made for the first lens unit to be arranged between the first objective and the first optical element. Hence the optical system according to the invention has the following sequence of units along the first optical axis: first objective-first lens unit-first optical element-first eyepiece.

In a further embodiment of the optical system according to the invention, provision is additionally or alternatively made for the first lens unit to have a first focal length and for the first objective to have a second focal length. Furthermore, the following relationship applies to the first focal length and the second focal length:

$$|f_1|>2 \cdot f_2,$$

wherein $f_1$ corresponds to the first focal length and wherein $f_2$ corresponds to the second focal length. It came as a surprise to discover that if the first focal length and the second focal length are selected according to this relationship, the aforementioned advantages are amplified.

In a further embodiment of the optical system according to the invention, provision is additionally or alternatively made for the first lens unit to have negative refractive power. Moreover, provision can for example be made for the first lens unit to be embodied as a first meniscus lens. By way of example, the latter can in turn be embodied such that the first meniscus lens has a first concave side, which is oriented in the direction of the first objective.

In one embodiment of the optical system according to the invention, provision is additionally or alternatively made for the optical system to have a first housing, wherein the first objective, the first image stabilizing unit and the first eyepiece are arranged in the first housing.

In a further exemplary embodiment of the optical system according to the invention, provision is additionally or alternatively made for the optical system to have at least a second objective, at least a second image stabilizing unit and at least a second eyepiece. As seen in the direction of the second eyepiece from the second objective, the second objective is arranged first along a second optical axis, then followed by the second image stabilizing unit and then followed by the second eyepiece. The second image stabilizing unit is rotatably mounted in cardan-joint fashion about a second hinge point, with reference being made to the text above in respect of the term cardan-joint-type mounting. Analogous statements apply here too. The second hinge point is the intersection of two axes arranged at right angles to one another, namely a third axis and a fourth axis, and also the second optical axis. The second hinge point is arranged between the second objective and the second eyepiece. Moreover, provision is made for the second image stabilizing unit to comprise a second lens unit and at least a second optical element, wherein the second lens unit and the second optical element are arranged such that the second lens unit is, together with the second optical element, rotatably mounted in cardan-joint fashion about the second hinge point.

In a further embodiment of the optical system according to the invention, provision is additionally or alternatively made for the second lens unit to be arranged between the second objective and the second optical element.

In a further exemplary embodiment of the optical system according to the invention, provision is alternatively or additionally made for the second lens unit to have a third focal length and for the second objective to have a fourth focal length. The following relationship applies to the third focal length and the fourth focal length:

$$|f_3|>2 \cdot f_4,$$

wherein $f_3$ corresponds to the third focal length and wherein $f_4$ corresponds to the fourth focal length. If the third focal length and the fourth focal length are selected according to this relationship, the aforementioned advantages are amplified.

In the aforementioned exemplary embodiments, provision is also additionally or alternatively made for the second lens unit to have only a single lens or for the second lens unit to have at least two lenses, for example in the form of a lens group.

In a further exemplary embodiment of the optical system according to the invention, provision is additionally or alternatively made for the optical system to have at least one of the following features:

the second lens unit has negative refractive power;
the second lens unit is embodied as a second meniscus lens; or the second lens unit is embodied as a second meniscus lens, wherein the second meniscus lens has a second concave side, which is oriented in the direction of the second objective.

In a further exemplary embodiment of the optical system according to the invention, provision is additionally or alternatively made for the optical system to have a second housing, wherein the second objective, the second image stabilizing unit and the second eyepiece are arranged in the second housing.

In a further exemplary embodiment of the optical system according to the invention, provision is additionally or alternatively made for the first optical element to be embodied as first erecting system. By way of example, the first optical element is embodied as first prism erecting system or as first lens erecting system.

Moreover, in a further exemplary embodiment of the optical system according to the invention, provision is additionally or alternatively made for the second optical element to be embodied as second erecting system. By way of example, the second optical element is embodied as second prism erecting system or as second lens erecting system.

In a further exemplary embodiment of the optical system according to the invention, provision is made for the first housing to be connected to the second housing via at least one folding bridge. The folding bridge has a first hinge part arranged on the first housing and a second hinge part arranged on the second housing. The folding bridge renders it possible to set the optical system such that the first housing and the second housing can be set to the pupil spacing of a user. Accordingly, the first housing and the second housing are arranged relative to one another such that the first housing is arranged in front of one of the two eyes of the user and such that the second housing is arranged in front of the other one of the two eyes of the user.

In a further exemplary embodiment of the optical system according to the invention, provision is additionally or alternatively made for the first housing to be embodied as a tube. In addition or as an alternative thereto, provision is made for the second housing to be embodied as a tube. In a further exemplary embodiment of the optical system according to the invention, the optical system is embodied as field glasses or as telescope.

In a further embodiment of the optical system according to the invention, provision is made for a first image plane, wherein, as seen in the direction of the first eyepiece from the first objective, the first objective is arranged first along the first optical axis of the optical system, then followed by the first image stabilizing unit, then followed by the first image plane and then followed by the first eyepiece. The first image stabilizing unit has at least a first entry surface and at least a first emergence surface. The first entry surface is directed at the first objective. By contrast, the first emergence surface is directed at the first image plane. Furthermore, the first emergence surface is arranged at a distance in a range from 1 mm to 20 mm from the first image plane. By way of example, the first emergence surface is arranged at a distance in a range from 2 mm to 15 mm from the first image plane or the first emergence surface is arranged at a distance in a range from 3 mm to 12 mm from the first image plane. Something corresponding can likewise be provided for the second image stabilizing unit. These embodiments are based on the surprising discovery that the arrangement of the emergence surface of the image stabilizing unit relative to the image plane in the aforementioned range renders it possible to reduce the moment of inertia of the image stabilizing unit to such an extent that motors with relatively little power, for example compared to the prior art, can be used to adjust the image stabilizing unit (e.g. piezo-drives). At the same time, it is possible to use smaller image stabilizing units than in the prior art, without imaging properties of the optical system according to the invention deteriorating.

In a further embodiment of the optical system according to the invention, provision is made for the optical system to be embodied as binocular field glasses, as monocular field glasses, as spotting scope or as telescope. In particular, provision is made for the optical system to have a magnification in the range from 8 to 80.

BRIEF DESCRIPTION OF THE DRAWINGS

Embodiments of the system described herein will now be explained in more detail on the basis of the figures. Here.

DETAILED DESCRIPTION OF VARIOUS EMBODIMENTS

The system described herein will be discussed below on the basis of an optical system in the form of binocular field glasses 1 (referred to only as field glasses below). However, reference is explicitly made to the fact that the system described herein is not restricted to binocular field glasses. Rather, the system described herein is suitable for any optical system, for example also in the case of a telescope.

Figure 1:
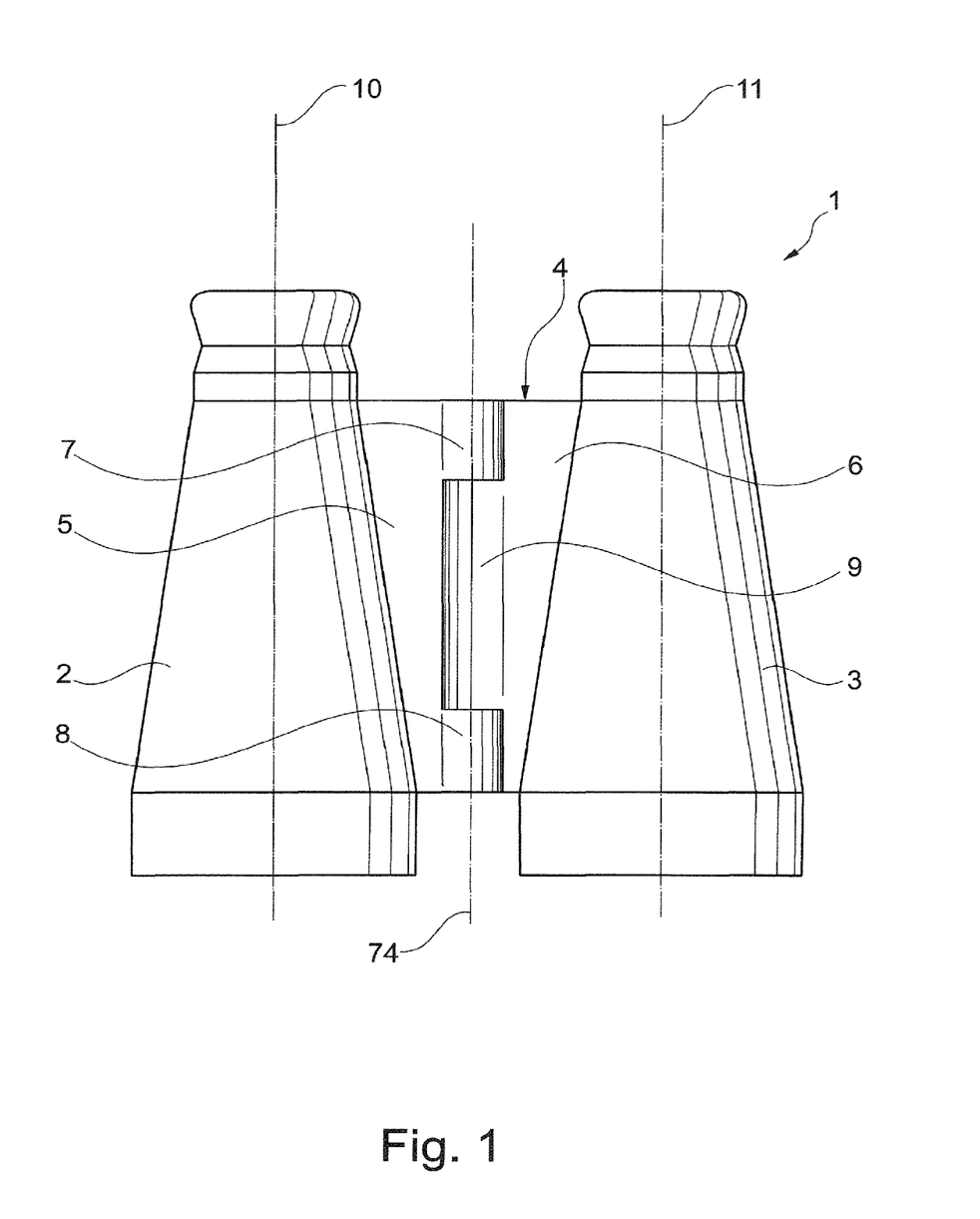
FIG. 1 shows an optical system in the form of field glasses with a folding bridge.

FIG. 1 shows a first schematic illustration of the field glasses 1, which have a tube-shaped first housing part 2 and a tube-shaped second housing part 3. A first optical axis 10 extends through the first housing part 2. By contrast, a second optical axis 11 extends through the second housing part 3. The first housing part 2 is connected to the second housing part 3 by means of a folding bridge 4. The folding bridge 4 has a first hinge part 5, which is formed onto the first housing part 2. Furthermore, the folding bridge 4 has a second hinge part 6, which is arranged on the second housing part 3. The first hinge part 5 has a first holding part 7 and a second holding part 8, between which a third holding part 9 of the second hinge part 6 is arranged. An axle pin (not illustrated) extends through the first holding part 7, the second holding part 8 and the third holding part 9 such that the relative position of the first housing part 2 and the second housing part 3 can be set with respect to one another about a joint axis 74. This renders it possible to set the first housing part 2 and the second housing part 3 to the pupil spacing of a user such that, firstly, the first housing part 2 is arranged in front of one of the two eyes of the user and such that, secondly, the second housing part 3 is arranged in front of the other one of the two eyes of the user.

Figure 2:
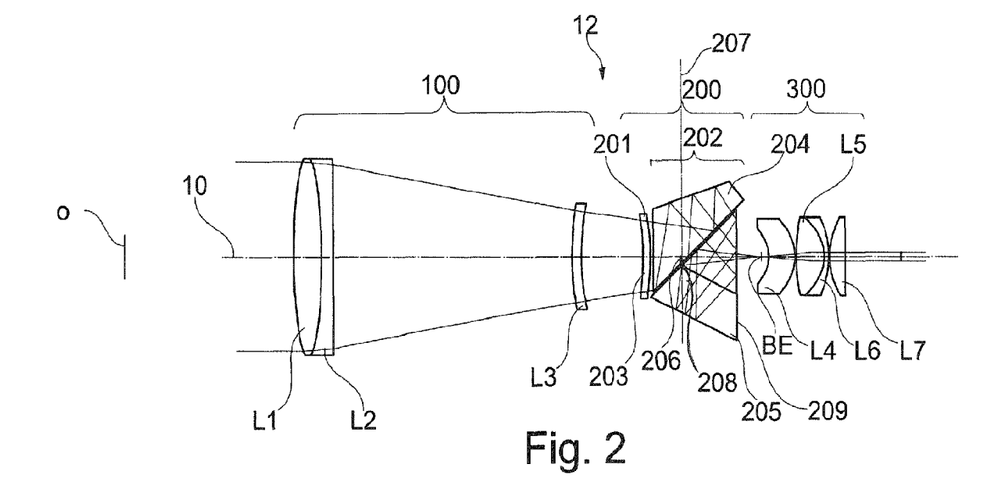
FIG. 2 shows a schematic illustration of a first optical subsystem of the field glasses as per FIG. 1.

FIG. 2 shows a schematic illustration of an embodiment of a first optical subsystem 12 of the field glasses 1 for imaging an object O. The first optical subsystem 12 is arranged in the first housing part 2 (cf. FIG. 1). The first optical subsystem 12 has a first objective 100, a first image stabilizing unit 200 and a first eyepiece 300. As seen in the direction of the first eyepiece 300 from the first objective 100, the first objective 100 is arranged first along the first optical axis 10, then followed by the first image stabilizing unit 200 and then followed by the first eyepiece 300.

The first objective 100 comprises 3 lenses, namely a first lens L1, a second lens L2 and a third lens L3. The first lens L1 and the second lens L2 form a cemented component. The third lens L3 is embodied as a single lens. Furthermore, the third lens L3 is embodied as focusing element and is axially displaceable along the first optical axis 10 for focusing purposes.

The first image stabilizing unit 200 firstly comprises a first lens unit 201 and a first prism erecting system 202. The first lens unit 201 is formed from a meniscus lens with negative refractive power. Furthermore, the first lens unit 201 has a first concave side 203, which is oriented in the direction of the first objective 100. The first prism erecting system 202 has a first prism 204 and a second prism 205. The form and configuration of the first prism 204 and the second prism 205 can be suitably selected. By way of example, the first prism 204 and the second prism 205 can be embodied as Schmidt-Pechan prism system, as first-type Porro prism system, as second-type Porro prism system, as Uppendahl prism system or as Abbe-Koenig prism system.

The first lens unit 201 and the first prism erecting system 202 form one unit. They are interconnected such that they move together. The first image stabilizing unit 200 is mounted in the housing part 2 in cardan-joint fashion. It therefore rotates about a first hinge point 206 about two axes, namely about a first axis 207 and about a second axis 208 arranged at right angles thereto which projects into the plane of the page. The first hinge point 206 is the intersection of the first axis 207 and the second axis 208. It lies on the first optical axis 10.

The first eyepiece 300 is composed of a plurality of single lenses, namely a fourth lens L4, a fifth lens L5, a sixth lens L6 and a seventh lens L7. The fifth lens L5 and the sixth lens L6 form a cemented component.

A first image plane BE is arranged between the first image stabilizing unit 200 and the first eyepiece 300. The second prism 205 has a first emergence surface 209 which is arranged at a distance in a range from 1 mm to 20 mm from the first image plane BE. By way of example, the first emergence surface 209 is arranged at a distance in a range from 2 mm to 15 mm from the first image plane BE or the first emergence surface 209 is arranged at a distance in a range from 3 mm to 12 mm from the first image plane BE.

Figure 3:
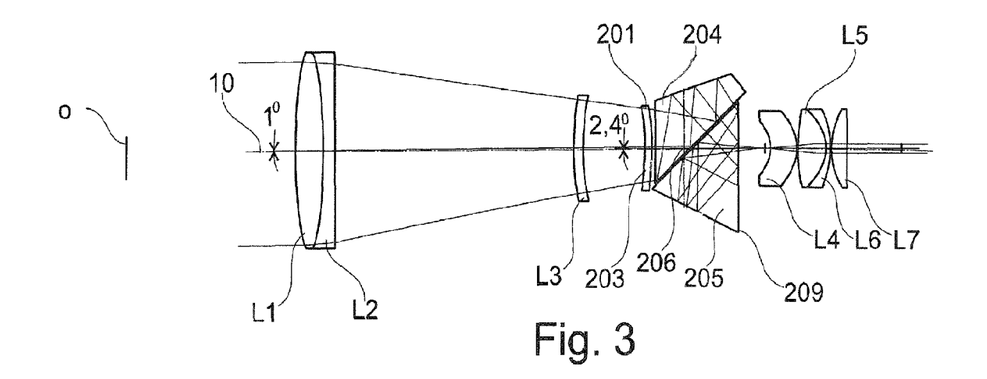
FIG. 3 shows a further schematic illustration of the first optical subsystem of the field glasses as per FIG. 1.

In order to compensate for a trembling movement of the field glasses 1 or the first housing part 2 as a result of a movement of the user of the field glasses 1 or as a result of a movement underfoot below the user, the first image stabilizing unit 200, i.e. both the first lens unit 201 and the first prism erecting system 202, is rotated about the first hinge point 206 by a predeterminable angle, for example in the range from −3° to +3°. Here, the movement of the first image stabilizing unit 200 can be passive or active. Naturally, a passive movement is not a movement with respect to the surroundings per se because the field glasses 1 undergo a countermovement and the first image stabilizing unit 200 "stays still" with respect to the surroundings. Nevertheless, this is still referred to as a passive movement. In the case of an active movement, use is made of, for example, motors (not illustrated) in order to rotate the first image stabilizing unit 200 by the corresponding angle. By way of example, piezo-drives are suitable as motors. FIG. 2 shows the first image stabilizing unit 200 in a non-rotated state. FIG. 3 shows a further illustration of the first optical subsystem 12 of the field glasses 1 as per FIG. 2. The same components have therefore been provided with the same reference signs. In contrast to FIG. 2, the field glasses 1 are rotated by approximately 1° clockwise about a pivot point on an entry surface of the objective 100 as a result of a trembling movement. The first image stabilizing unit 200 is counter-tilted relative to the first housing part 2 by a predeterminable angle about the first hinge point 206, for example in the range from 0.5° to 3°. Some exemplary embodiments provide for a predeterminable angle of 2.4°.

The first lens unit 201 has a negative refractive power. What this results in is that it is possible to select the eyepiece focal length and the magnification of the field glasses 1 such that the focal length of the objective 100 can be kept so short that the overall design of the field glasses in respect of the length thereof is no longer than the prior art. An exemplary embodiment is mentioned further below.

Figure 4:
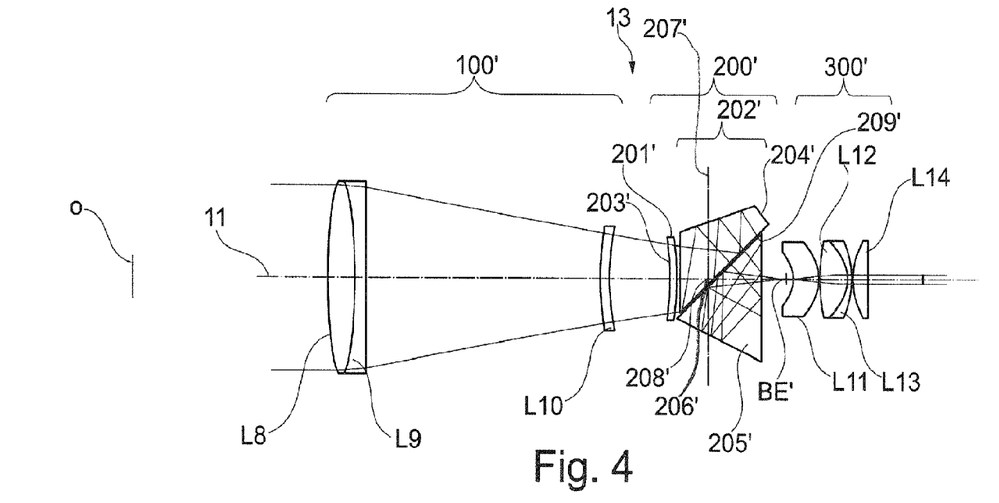
FIG. 4 shows a schematic illustration of a second optical subsystem of the field glasses as per FIG. 1.

FIG. 4 shows a schematic illustration of an embodiment of a second optical subsystem 13 of the field glasses 1 for imaging the object O. The second optical subsystem 13 is arranged in the second housing part 3 (cf. FIG. 1). The second optical subsystem 13 has a second objective 100', a second image stabilizing unit 200' and a second eyepiece 300'. As seen in the direction of the second eyepiece 300' from the second objective 100', the second objective 100' is arranged first along the second optical axis 11, then followed by the second image stabilizing unit 200' and then followed by the second eyepiece 300'. The design of the second objective 100', the second image stabilizing unit 200' and the second eyepiece 300' is discussed in more detail below.

The second objective 100' also comprises 3 lenses, namely an eighth lens L8, a ninth lens L9 and a tenth lens L10. The eighth lens L8 and the ninth lens L9 form a cemented component. The tenth lens L10 is embodied as a single lens. Furthermore, the tenth lens L10 is embodied as focusing element and is axially displaceable along the second optical axis 11 for focusing purposes.

In principle, the second image stabilizing unit 200' has the same design as the first image stabilizing unit 200. Thus, the second image stabilizing unit 200' firstly comprises a second lens unit 201' and a second prism erecting system 202'. The second lens unit 201' is formed from a meniscus lens with negative refractive power. Furthermore, the second lens unit 201' has a second concave side 203', which is oriented in the direction of the second objective 100'. The second prism erecting system 202' in turn has a third prism 204' and a fourth prism 205'. The form and configuration of the third prism 204' and the fourth prism 205' can be suitably selected. By way of example, the third prism 204' and the fourth prism 205' can be embodied as Schmidt-Pechan prism system, as first-type Porro prism system, as second-type Porro prism system, as Uppendahl prism system or as Abbe-Koenig prism system.

The second lens unit 201' and the second prism erecting system 202' also form one unit. They are interconnected such that they move together. The second image stabilizing unit 200' is mounted in the second housing part 3 in cardan-joint fashion. It therefore rotates about a second hinge point 206' about two axes, namely about a third axis 207' and about a fourth axis 208' arranged at right angles thereto which projects into the plane of the page. The third axis 207' and the fourth axis 208' intersect at the second hinge point 206', which is arranged on the second optical axis 11.

The second eyepiece 300' is likewise composed of a plurality of single lenses, namely an eleventh lens L11, a twelfth lens L12, a thirteenth lens L13 and a fourteenth lens L14. The twelfth lens L12 and the thirteenth lens L13 form a cemented component. A second image plane BE' is arranged between the second image stabilizing unit 200' and the second eyepiece 300'. The fourth prism 205' has a second emergence surface 209' which is arranged at a distance in a range from 1 mm to 20 mm from the second image plane BE'. By way of example, the second emergence surface 209' is arranged at a distance in a range from 2 mm to 15 mm from the second image plane BE' or the second emergence surface 209' is arranged at a distance in a range from 3 mm to 12 mm from the second image plane BE'.

Figure 5:
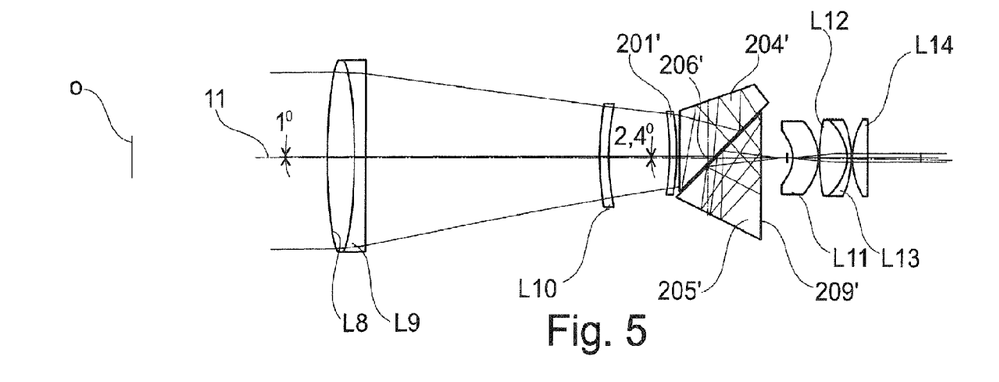
FIG. 5 shows a further schematic illustration of the second optical subsystem of the field glasses as per FIG. 1.

In order to compensate for a trembling movement of the field glasses 1 or the housing part 3 as a result of a movement of the user of the field glasses 1 or as a result of a movement underfoot below the user, the second image stabilizing unit 200', i.e. both the second lens unit 201' and the second prism erecting system 202', is rotated about the second hinge point 206' by a predeterminable angle, for example in the range from −3° to +3°. Here, the movement of the second image stabilizing unit 200' can be passive or active. In this respect, reference is also made to the text above. In the case of an active movement, use is made of, for example, motors (not illustrated) in order to rotate the second prism erecting system 202' and the second lens unit 201' by the desired angle. By way of example, piezo-drives are used as motors. FIG. 4 shows the second image stabilizing unit 200' in a non-rotated state. FIG. 5 shows a further illustration of the second optical subsystem 13 of the field glasses 1 as per FIG. 4. The same components have therefore been provided with the same reference signs. In contrast to FIG. 4, the field glasses 1 are rotated by approximately 1° clockwise about a pivot point on an entry surface of the objective 100' as a result of a trembling movement. The second image stabilizing unit 200' is counter-tilted relative to the second housing part 3 by a predeterminable angle about the second hinge point 206', for example in the range from 0° to 3°. Some exemplary embodiments provide for a predeterminable angle of 2.4°.

As already mentioned above, the second lens unit 201' has negative refractive power. What this results in is that it is possible to select the eyepiece focal length and the magnification of the field glasses 1 such that the focal length of the second objective 100' can be kept so short that the overall design of the field glasses 1 in respect of the length thereof is no longer than the prior art. An exemplary embodiment is mentioned further below.

In principle, the first optical subsystem 12 and the second optical subsystem 13 can have an identical design. By way of example, the first optical subsystem 12 and the second optical subsystem 13, which were described above, have an identical design. However, reference is explicitly made to the fact that it is not mandatory for the two optical subsystems 12 and 13 to have an identical design.

Figure 6:
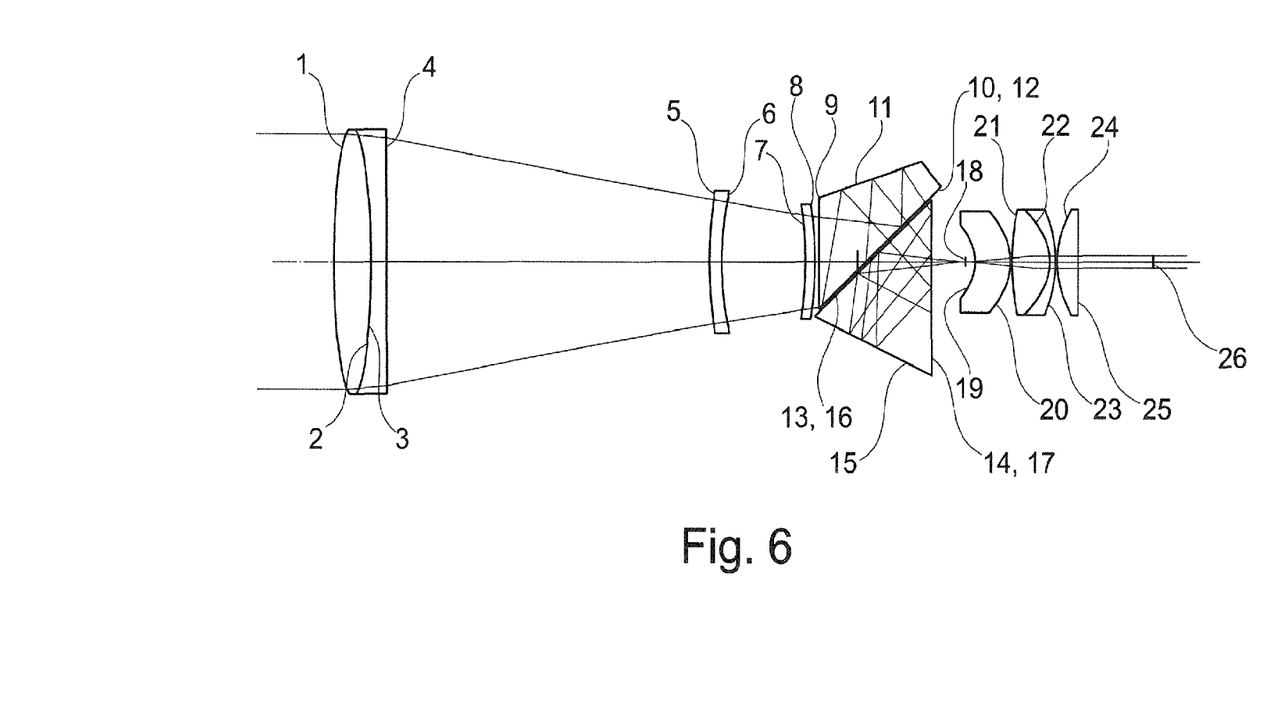
FIG. 6 shows a further schematic illustration of the first optical subsystem or the second optical subsystem.

FIG. 6 shows the first optical subsystem 12 or the second optical subsystem 13, but, however, only the surfaces have been provided with reference signs. In the exemplary embodiments described here, the first optical subsystem 12 or the second optical subsystem 13 has the properties compiled in the following table.

| Surface | Radii [mm] | Thicknesses Spacings [mm] | Glass | $n_e$ | $n_{c'}$ | $n_F$ | $n_g$ |
|---|---|---|---|---|---|---|---|
| 1 | 81.751 | | | 1.000000 | 1.000000 | 1.000000 | 1.000000 |
| | | 7.200 | S-BSM10 | 1.625400 | 1.620010 | 1.631030 | 1.636371 |
| 2 | −124.101 | | | | | | |
| | | 0.228 | | 1.000000 | 1.000000 | 1.000000 | 1.000000 |
| 3 | −112.205 | | | | | | |
| | | 3.500 | S-TIH6 | 1.812640 | 1.797520 | 1.829740 | 1.847295 |
| 4 | −354.852 | | | | | | |
| | | 63.634 | | 1.000000 | 1.000000 | 1.000000 | 1.000000 |
| 5 | 199.532 | | | | | | |
| | | 2.200 | S-FSL5 | 1.489150 | 1.485690 | 1.492670 | 1.495961 |
| 6 | 76.078 | | | | | | |
| | | 16.566 | | 1.000000 | 1.000000 | 1.000000 | 1.000000 |
| 7 | −66.724 | | | | | | |
| | | 1.500 | S-FSL5 | 1.489150 | 1.485690 | 1.492670 | 1.495961 |
| 8 | −87.836 | | | | | | |
| | | 1.000 | | 1.000000 | 1.000000 | 1.000000 | 1.000000 |
| 9 | Inf | | | | | | |
| | | 9.214 | N-BK7 | 1.518720 | 1.514720 | 1.522830 | 1.526680 |
| 10 | Inf | | | | | | |
| | | 14.781 | N-BK7 | 1.518720 | 1.514720 | 1.522830 | 1.526680 |
| 11 | Inf | | | | | | |
| | | 9.890 | N-BK7 | 1.518720 | 1.514720 | 1.522830 | 1.526680 |
| 12 | Inf | | | | | | |
| | | 0.600 | | 1.000000 | 1.000000 | 1.000000 | 1.000000 |
| 13 | Inf | | | | | | |
| | | 6.983 | N-BK7 | 1.518720 | 1.514720 | 1.522830 | 1.526680 |
| 14 | Inf | | | | | | |
| | | 20.574 | N-BK7 | 1.518720 | 1.514720 | 1.522830 | 1.526680 |
| 15 | Inf | | | | | | |
| | | 13.649 | N-BK7 | 1.518720 | 1.514720 | 1.522830 | 1.526680 |
| 16 | Inf | | | | | | |
| | | 12.340 | N-BK7 | 1.518720 | 1.514720 | 1.522830 | 1.526680 |
| 17 | Inf | | | | | | |
| | | 5.550 | | 1.000000 | 1.000000 | 1.000000 | 1.000000 |
| 18 | Inf | | | | | | |
| | | 2.965 | | 1.000000 | 1.000000 | 1.000000 | 1.000000 |

-continued

| Surface | Radii [mm] | Thicknesses Spacings [mm] | Glass | $n_e$ | $n_{e'}$ | $n_F$ | $n_g$ |
|---|---|---|---|---|---|---|---|
| 19 | −8.785 | | | | | | |
| | | 6.940 | S-BAL35 | 1.591430 | 1.586660 | 1.596370 | 1.601031 |
| 20 | −11.885 | | | | | | |
| | | 0.220 | | 1.000000 | 1.000000 | 1.000000 | 1.000000 |
| 21 | 52.330 | | | | | | |
| | | 7.550 | S-BAL35 | 1.591430 | 1.586660 | 1.596370 | 1.601031 |
| 22 | −10.669 | | | | | | |
| | | 1.100 | S-TIH53 | 1.855040 | 1.838070 | 1.874310 | 1.894195 |
| 23 | −21.135 | | | | | | |
| | | 0.200 | | 1.000000 | 1.000000 | 1.000000 | 1.000000 |
| 24 | 16.430 | | | | | | |
| | | 4.450 | S-BAL35 | 1.591430 | 1.586660 | 1.596370 | 1.601031 |
| 25 | −165.480 | | | | | | |
| | | 14.600 | | 1.000000 | 1.000000 | 1.000000 | 1.000000 |
| 26 | Inf | | | | | | |
| | | | | 1.000000 | 1.000000 | 1.000000 | 1.000000 |

In the aforementioned table, the individual surfaces of the individual optical units and the radii thereof are specified. Furthermore, the distance from the vertex of a first surface to the vertex of the next surface is specified. This likewise reproduces the thickness of the individual optical units. Furthermore, n denotes the refractive index, with the latter being specified for various lines. Moreover, the glass type of the respective optical unit is specified, with the notation of the glass types relating to glass types provided by OHARA and SCHOTT.

The magnification of the exemplary embodiment described in the table is 15. Furthermore, the focal length of the first objective 100 or the second objective 100' is 167.40 mm, the focal length of the first lens unit 201 or the second lens unit 201' is −581.09 mm, the focal length of the first objective 100 together with the first lens unit 201 or the second objective 100' together with the second lens unit 201' is 187.34 mm and the focal length of the first eyepiece 300 or the second eyepiece 300' is 12.48 mm.

Now, it was found after deliberations that almost no coma is caused by the tilts by the first image stabilizing unit 200 and the second image stabilizing unit 200' provided for stabilizing the image. In the field glasses 1, the image quality during image stabilization does not deteriorate as a result of a coma caused during the tilting of the respective image stabilizing unit. The first lens unit 201 and the second lens unit 201' only have a small influence or no influence on image stabilization. What the first lens unit 201 or the second lens unit 201' brings about is that there is no bothersome coma in the case of a first prism erecting system 202 or a first second prism erecting system 202', which is tilted for image stabilization, or that the additional coma occurring is so small that it is not perceived as bothersome.

So that the influence of the first lens unit 201 or the second lens unit 201' on the image quality is as small as possible, it is advantageous if the first lens unit 201 and the second lens unit 201' have certain properties. Thus, it was found after deliberations that the first lens unit 201 or the second lens unit 201' should be designed in a meniscus-shaped fashion and that the concave side 203 or 203' of the first lens unit 201 or the second lens unit 201' should respectively point in the direction of the first objective 100 or the second objective 100'. Furthermore, it was found after deliberations that the first lens unit 201 or the second lens unit 201' should be arranged such that it is situated between the objective 100 or 100' and the prism erecting system 202 or 202'. Furthermore, the following condition should apply to the focal length:

$$|f_{lens\ unit}| > 2 \cdot f_{objective}$$

If the focal lengths are selected according to this relationship, the aforementioned advantages are amplified.

All suitable objective types can be used for the first objective 100 and the second objective 100'. The objective shown in the exemplary embodiments, in the form of a three-lens objective with possible internal focusing, is only one possible example. It is also possible to use all suitable eyepiece types for the first eyepiece 300 and the second eyepiece 300'. The four-lens eyepiece shown in the exemplary embodiment is only one possible example.

Embodiments of the invention provide for the optical system according to the invention to have a magnification in the range from 8 to 80. In the case of exemplary embodiments with great magnification (e.g. greater than 18), it is possible to use optical members consisting of a number of lenses as first lens unit 201 and as second lens unit 201' in order to avoid chromatic aberrations.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. An optical system for imaging an object, comprising:
   at least one first objective disposed along a first optical axis;
   at least one first eyepiece disposed along the first optical axis; and
   at least one first image stabilizing unit disposed along the first optical axis between the at least one first objective and the at least one first eyepiece, wherein the at least one first image stabilizing unit is rotatably mounted in cardan-joint fashion about a first hinge point, and wherein the first hinge point is disposed between the at least one first objective and the at least one first eyepiece, wherein the at least one first image stabilizing unit comprises at least one first lens unit and at least one first optical element, wherein the at least one first lens unit and the at least first optical element are disposed such that the at least one first lens unit is, together with the first optical element, rotatably mounted in cardan-joint fashion about the first hinge point, and wherein the at least one first optical element is embodied as first prism erecting system.

2. The optical system according to claim 1, wherein the at least one first lens unit is disposed between the at least one first objective and the at least one first optical element.

3. The optical system according to claim 1, wherein the at least one first lens unit has a first focal length, wherein the at least one first objective has a second focal length, and wherein the following relationship applies to the first focal length and the second focal length:

$|f_1| > 2 \cdot f_2,$ wherein $f_1$ corresponds to the first focal length and wherein $f_2$ corresponds to the second focal length.

4. The optical system according to claim 1, further comprising one of the following features:
the at least one first lens unit only has a single lens; or
the at least one first lens unit has at least two lenses.

5. The optical system according to claim 1, further comprising at least one of the following features:
the at least one first lens unit has negative refractive power;
the at least one first lens unit is embodied as a first meniscus lens; or
the at least one first lens unit is embodied as a first meniscus lens, wherein the first meniscus lens has a first concave side, which is oriented in the direction of the at least one first objective.

6. The optical system according to claim 1, further comprising:
a first housing, wherein the at least one first objective, the at least one first image stabilizing unit and the at least one first eyepiece are disposed in the first housing.

7. The optical system according to claim 1, further comprising:
at least one second objective disposed along a second optical axis;
at least one second eyepiece disposed along the second optical axis; and
at least one second image stabilizing unit disposed along the second optical axis between the at least one second objective and the at least one second eyepiece, wherein the at least one second image stabilizing unit is rotatably mounted in cardan-joint fashion about a second hinge point, wherein the second hinge point is disposed between the at least one second objective and the at least one second eyepiece, and wherein the at least one second image stabilizing unit comprises at least one second lens unit and at least one second optical element, wherein the at least one second lens unit and the at least one second optical element are disposed such that the at least one second lens unit is, together with the at least one second optical element, rotatably mounted in cardan-joint fashion about the second hinge point.

8. The optical system according to claim 7, wherein the at least one second lens unit is disposed between the at least one second objective and the at least one second optical element.

9. The optical system according to claim 7, wherein the at least one second lens unit has a third focal length, wherein the at least one second objective has a fourth focal length, and wherein the following relationship applies to the third focal length and the fourth focal length:

$|f_3| > 2 \cdot f_4,$ wherein $f_3$ corresponds to the third focal length and wherein $f_4$ corresponds to the fourth focal length.

10. The optical system according to claim 7, further comprising one of the following features:
the at least one second lens unit only has a single lens; or
the at least one second lens unit has at least two lenses.

11. The optical system according to claim 7, further comprising at least one of the following features:
the at least one second lens unit has negative refractive power;
the at least one second lens unit is embodied as a second meniscus lens; or
the at least one second lens unit is embodied as a second meniscus lens, wherein the second meniscus lens has a second concave side, which is oriented in the direction of the second objective.

12. The optical system according to claim 7, further comprising:
a second housing, wherein the at least one second objective, the at least one second image stabilizing unit and the at least one second eyepiece are disposed in the second housing.

13. The optical system according to claim 7, further comprising one of the following features:
the at least one second optical element is embodied as second erecting system,
the at least one second optical element is embodied as second prism erecting system; or
the at least one second optical element is embodied as second lens erecting system.

14. The optical system according to claim 12, further comprising:
a first housing, wherein the at least one first objective, the at least one first image stabilizing unit and the at least one first eyepiece are disposed in the first housing, wherein the first housing is connected to the second housing via at least one folding bridge, wherein the at least one folding bridge has a first hinge part disposed on the first housing, and wherein the at least one folding bridge has a second hinge part disposed on the second housing.

15. The optical system according to claim 6, wherein the first housing is embodied as a tube.

16. The optical system according to claim 12, wherein the second housing is embodied as a tube.

17. The optical system according to claim 1, wherein the optical system is embodied as binocular field glasses, as spotting scope or as telescope.

18. The optical system according to claim 1, wherein the optical system is embodied as monocular field glasses.

19. The optical system according to claim 1, wherein the optical system has a magnification in the range from 8 to 80.

20. An optical system for imaging an object, comprising:
at least one first objective disposed along a first optical axis;
at least one first eyepiece disposed along the first optical axis; and
at least one first image stabilizing unit disposed along the first optical axis between the at least one first objective and the at least one first eyepiece, wherein the at least one first image stabilizing unit is rotatably mounted in cardan-joint fashion about a first hinge point, and wherein the first hinge point is disposed between the at least one first objective and the at least one first eyepiece,
wherein the at least one first image stabilizing unit comprises at least one first lens unit and at least one first optical element, wherein the at least one first lens unit and the at least one first optical element are disposed such that the at least one first lens unit is, together with the first optical element, rotatably mounted in cardan-joint fashion about the first hinge point, wherein the at least one first lens unit has a first focal length, wherein the at least one first objective has a second focal length, and wherein the following relationship applies to the first focal length and the second focal length:

$|f_1| > 2 \cdot f_2,$ wherein $f_1$ corresponds to the first focal length and wherein $f_2$ corresponds to the second focal length.

21. An optical system for imaging an object, comprising:
an objective disposed along an optical axis of the optical system;
an eyepiece disposed along the optical axis; and
an image stabilizing unit having a lens unit and a prism erecting system that move as a unit, the image stabilizing unit being disposed along the optical axis between the objective and the eyepiece and rotatably mounted in cardan-joint fashion to rotate about an axis that is perpendicular to the optical axis.

\* \* \* \* \*

UNITED STATES PATENT AND TRADEMARK OFFICE
CERTIFICATE OF CORRECTION

PATENT NO. : 9,581,828 B2  
APPLICATION NO. : 14/372138  
DATED : February 28, 2017  
INVENTOR(S) : Volker Tautz et al.

Page 1 of 1

It is certified that error appears in the above-identified patent and that said Letters Patent is hereby corrected as shown below:

Page 2, Column 2 under FOREIGN PATENT DOCUMENTS, replace "DE 10 2005 027 871 A1" with --DE 10 2005 027 870 A1--.

Column 3, Line 5, replace header "SUMMARY" with --SUMMARY OF THE INVENTION--.

Column 8, Line 18, replace "field glasses" with --field glasses 1--.

Column 11, Lines 49 and 50, replace "first second prism" with --second prism--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*